United States Patent [19]

Frierdich

[11] Patent Number: 4,639,657
[45] Date of Patent: Jan. 27, 1987

[54] ELECTRICAL CONTROL APPARATUS AND METHODS
[75] Inventor: Waldo J. Frierdich, Highland, Ill.
[73] Assignee: Basler Electric Company, Highland, Ill.
[21] Appl. No.: 645,559
[22] Filed: Aug. 30, 1984
[51] Int. Cl.[4] ............................................. H02P 7/12
[52] U.S. Cl. ....................................... 322/59; 322/75; 322/83; 322/99; 323/326
[58] Field of Search ................. 322/83, 75.59, 99, 80; 323/242, 326; 307/130; 340/645

[56]  References Cited
U.S. PATENT DOCUMENTS

| | | | |
|---|---|---|---|
| 1,911,074 | 9/1931 | Fitzgerald | 322/83 X |
| 3,316,479 | 4/1967 | Frierdich | 322/25 |
| 3,324,384 | 7/1963 | Jokl et al. | 322/83 |
| 3,518,528 | 6/1970 | Frierdich | 322/25 |
| 3,535,591 | 10/1970 | Holmquest | 317/27 |
| 3,794,908 | 2/1974 | Lindblom et al. | 340/645 X |
| 3,944,905 | 3/1976 | Allport et al. | 322/99 X |
| 4,218,647 | 8/1980 | Haas | 323/9 |
| 4,240,134 | 12/1980 | Nakazawa et al. | 363/21 |
| 4,264,856 | 4/1981 | Frierdich et al. | 322/25 |
| 4,306,184 | 12/1981 | Iwaki et al. | 322/99 |
| 4,438,385 | 3/1984 | Sato et al. | 322/28 |

Primary Examiner—Patrick R. Salce
Assistant Examiner—Mark D. Simpson
Attorney, Agent, or Firm—Senniger, Powers, Leavitt & Roedel

[57] ABSTRACT

Apparatus for use in an electrical power generating system including a generator for supplying an A.C. output voltage to a load on a set of lines and a circuit responsive to the A.C. output voltage for producing a regulating voltage, the generator having a winding the D.C. energization of which controls the A.C. output voltage. The apparatus controls the energization of the winding and includes a switching circuit adapted to be connected across a resistance and which when rendered conductive bypasses the resistance to couple the voltage regulating circuit to the winding with negligible loss of energy. The switching circuit is combined with a circuit that produces a signal when an increase in the A.C. output voltage exceeding a preselected parameter occurs, and with another circuit that renders the switching circuit nonconductive in response to the signal thereby causing the resistance to consume energy from the winding. Methods of operation of the apparatus are also described.

39 Claims, 7 Drawing Figures

ELECTRICAL CONTROL APPARATUS AND METHODS

BACKGROUND OF THE INVENTION

This invention relates to apparatus and methods for controlling the alternating current (A.C.) output voltage of an electrical power generating system including a generator having a winding the direct current (D.C.) energization of which influences the A.C. output voltage. In particular, this invention relates to apparatus and methods for controlling the energization of the winding in controlling the A.C. output voltage.

Heretofore, it is has been recognized that when an A.C. generator has a varying load, its output voltage tends to vary. In fact, when an A.C. generator rejects the load (i.e., due to an overload of such a magnitude that a protective breaker opens the circuit supplying the load), or has its electrical load suddenly reduced, the output voltage can rise abruptly. It is highly desirable to maintain the A.C. output voltage essentially at an established nominal system voltage and to control the A.C. output voltage to prevent significant departures from the nominal system voltage under any conditions.

D.C. power has been applied to a field winding of an A.C. generator through a motor controlled rheostat which provides adjustment of the generator terminal voltage. A field breaker, a disconnect switch, and field discharge resistor have been connected across the field winding of the generator. Such a system is relatively slow in its response to occurrences of load rejection. Moreover, such a system also involves continuous dissipation of power and represents lost energy and lost revenue, and increases power house ambient temperature with a consequent reduced longevity of equipment affected by the increased ambient temperature.

An A.C. generator, or alternator, typically has an armature winding for producing an A.C. output voltage and a field winding externally supplied with direct current energization which controls the A.C. output voltage of the generator. When the field is wound on the stator, the armature winding is on the rotor and the A.C. output voltage is taken from the armature by slip rings and brushes. When high A.C. voltages are required, the field winding is part of the rotor and the armature is part of the stator with the A.C. output voltage being directly taken from the stator. The alternating current can be generated at high voltages because no movable contacts are required to connect the armature to an electrical load as would be the case if the armature were revolving. The rotating field winding can be externally supplied with direct current through brushes and slip rings.

The use of brushes is avoided altogether by having the rotating field winding of the alternator supplied with electricity by a generator, known as a rotary exciter, mounted on the same shaft as the alternator rotor. The rotary exciter, in turn, has a field winding of its own which is wound on its stator and is directly energized by D.C. The rotating alternator field winding is then directly supplied with D.C. from the exciter armature, e.g., through rectifying diodes. Both the rotating field winding of the alternator and the field winding of the rotary exciter are herein regarded as further examples of a winding, the D.C. energization of which controls the A.C. output voltage of the generator.

A unit known as a regulator provides the D.C. energization. One type of regulator is called a shunt static exciter (SSE), which is a unit widely used in the industry and readily available. Such regulators exhibit many useful features, but the speed with which they can reduce the generator excitation is limited by the inherent time constant of the winding, the D.C. energization of which controls the A.C. output voltage.

Some known regulating systems are disclosed in the following coassigned patents U.S. Pat. No. 3,518,528 "Generator Voltage Regulator with Reactor Sensing Means," U.S. Pat. No. 3,316,479 "Regulating Systems for Alternating Current Generators," and U.S. Pat. No. 4,264,856 "System for Maintaining Excitation of an Alternating Current Generator During Excessive Output Current Conditions."

SUMMARY OF THE INVENTION

Among the objects of the present invention are to provide apparatus and methods for very rapidly returning the A.C. output voltage of an electrical generator to a nominal system voltage when load rejection occurs; to provide such apparatus and methods which can be utilized in an electrical power generating system without continuously consuming electrical energy in substantial amounts; to provide such apparatus and methods which can determine either directly or indirectly from the behavior of the A.C. output voltage when control measures are required; to provide apparatus and methods to control and maintain the A.C. output voltage of a generator at or near a nominal voltage regardless of whether the load presented to the generator is changing slowly or abruptly; to provide apparatus for controlling the A.C. output voltage of the generator if the load changes abruptly, which can be combined with a voltage regulator which controls the generator's A.C. output voltage when the load is changing slowly; to provide such apparatus and methods which may utilize regulating voltages having a variety of waveforms; to provide such apparatus and methods which are compatible with a variety of A.C. generators having different voltages and D.C. energization requirements; to provide apparatus which is capable of being manufactured in economical and compact units; to provide such apparatus and methods which are conveniently compatible with procedures for starting and stopping an A.C. generator; and to provide such apparatus and methods which convey information to an operator about the operating state thereof.

Other objects and features will be in part apparent and in part pointed out hereinafter.

Generally, apparatus of the invention is intended for use in an electrical power generating system including a generator for supplying an A.C. output voltage to a load on a set of lines, means responsive to the A.C. output voltage for producing a regulating voltage, the generator having a winding the D.C. energization of which controls the A.C. output voltage, and an electrical resistance for connection between the winding and the voltage regulating means. The apparatus includes switching means adapted to be connected across the resistance and which when rendered conductive bypasses the resistance to couple the voltage regulating means to the winding with negligible loss of energy, combined with means for producing a signal when an increase in the A.C. output voltage exceeding a preselected parameter occurs, and with means for rendering the switching means nonconductive in response to the signal thereby causing the resistance to consume energy from the winding.

A method form of the invention is used with voltage regulating means which produces a variable regulating voltage that falls to a predetermined value upon an increase in the A.C. output voltage exceeding a preselected parameter. The method includes the steps of initiating consumption of energy from the winding in response to the fall in the variable regulating voltage to the predetermined value and then, when the variable regulating voltage rises above the predetermined value, coupling the voltage regulating means to the winding with negligible loss of energy.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
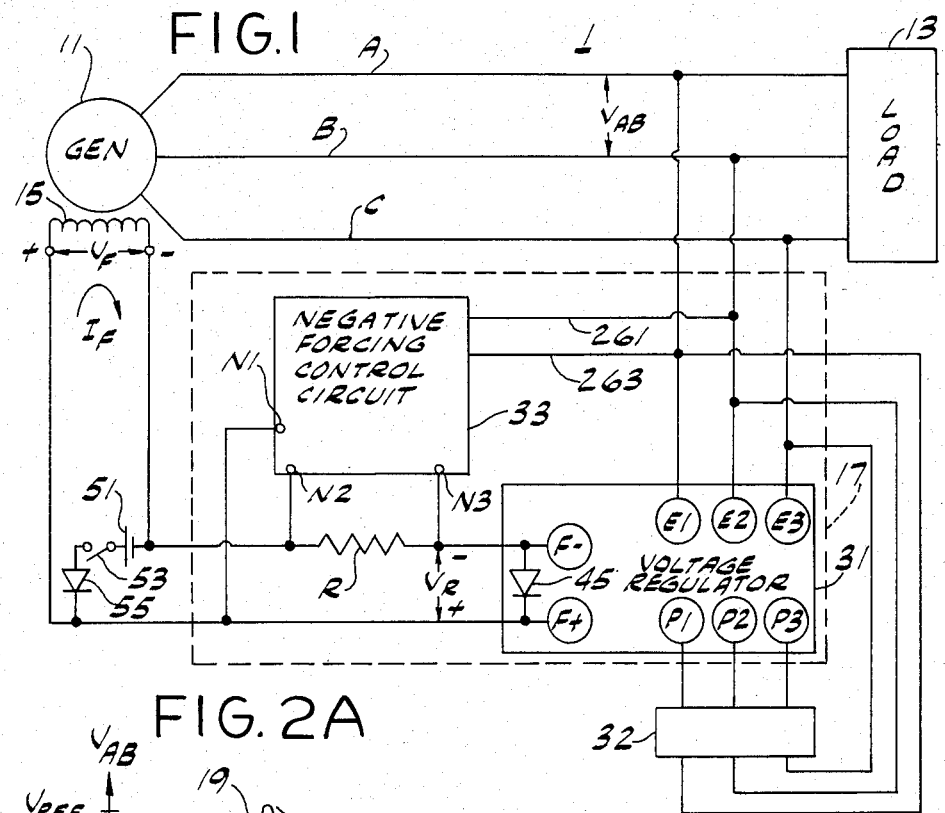
FIG. 1 is a block diagram of an electrical power generating system utilizing control apparatus according to the invention.

In FIG. 1 an electrical power generating system 1 includes a generator 11 for supplying a three-phase A.C. output voltage to a load 13 on a set of lines A, B, and C. The voltages between lines A and B, B and C, and A and C are generally arranged to be approximately equal in magnitude and 120° out of phase at a nominal system frequency of 50 Hz. or 60 Hz. For the present purposes the root-mean-square (r.m.s.) value VAB of the voltage between lines A and B is taken as representative of the A.C. output voltage of generator 11.

Generator 11 has a field winding 15 the direct current (D.C.) energization of which sets up a magnetic field in generator 11 and thereby controls the voltage value $V_{AB}$. A prime mover turns a rotor (not shown) of the generator 11, and mechanical energy is converted into electrical energy on the lines A, B, and C in well known conventional manner.

It is desirable in practice for the voltage value $V_{AB}$ to be maintained relatively constant at a nominal system voltage value. This function is accomplished by control apparatus 17 of the invention. Control apparatus 17 is connected to the lines A, B, and C for receiving power therefrom and for sensing departures from the nominal system voltage value and correcting them. In turn control apparatus 17 builds up and adjustably maintains a current $I_F$ in the winding 15 of generator 11. For instance, if the generator voltage $V_{AB}$ decreases, control apparatus 17 increases the current $I_F$ to return the decreased generator voltage to nominal. If the generator voltage $V_{AB}$ increases either slowly because of normal system load variations or abruptly because of load rejection by circuit breaker apparatus (regarded as being in the block marked for load 13), control apparatus 17 advantageously decreases the current $I_F$ to return the increased generator voltage to nominal.

Figure 2A:
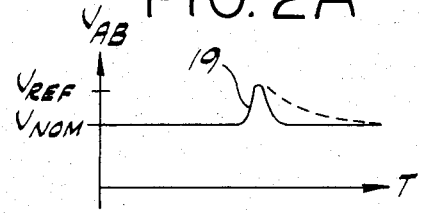
FIG. 2A is a voltage versus time graph of r.m.s. A.C. output voltage from a generator in the system of FIG. 1 during an occurrence of load rejection.

FIG. 2A shows a relatively abrupt rise 19 in the voltage $V_{AB}$ upon an occurrence of load rejection. In order to return the voltage $V_{AB}$ to nominal when it rises due to abruptly decreased load, a relatively abrupt negative change in the winding current $I_F$ is needed. However, the winding 15 exhibits a substantial inductance $L_F$, and the current $I_F$ tends to continue to flow in the winding, once it is built up therein, according to the familiar "flywheel" effect in inductors. This is because the voltage across an ideal inductor is proportional to the rate of change (derivative) of the current. Once a current $I_F$ has been built up, it decreases only relatively slowly because of inherent resistance $R_F$ in the winding 15 even when the voltage $V_F$ across the winding is reduced to zero. The winding voltage is related to the winding current by the equation $$V_F = L_F dI_F/dt + I_F R_F \quad (1)$$

Assume that control apparatus 17 has built up the current $I_F$ to a value $I_0$. If the voltage $V_F$ be reduced to zero, the behavior of current $I_F$ is given by solving differential equation (1) with result:

$$I_F = I_0 e^{-T/T_0} \quad (2)$$

where T0 is the time constant of the winding 15 given by $$T0 = L_F/R_F \quad (3)$$

Figure 2B:
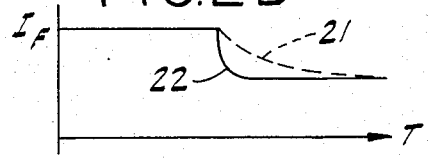
FIG. 2B is a current-versus-time graph of current in the field winding of the generator in the system of FIG. 1.

FIG. 2B shows this relatively slow decay of the current in the winding 15 as dashed line 21.

To solve the problem of the flywheel effect, control apparatus 17 temporarily and automatically introduces an extra resistance R for decreasing the winding current $I_F$ rapidly upon a sudden increase in A.C. output voltage $V_{AB}$ such as occurs when load is rejected. The extra resistance R substantially decreases the time constant for decay of the winding current according to the equation $$T0' = L_{Fl}/(R_F + R) \quad (4)$$

The introduction of the extra resistance R causes the winding current $I_F$ to be forced to decrease much more rapidly according to curve 22 in FIG. 2B. This process is called "negative forcing" for the present purposes. When resistance R is not needed for negative forcing, it is electrically removed from the circuit by control apparatus 17 so that unnecessary energy loss is prevented.

Control apparatus 17 includes a voltage regulator 31 and a control circuit 33 for accomplishing the negative forcing. The voltage regulator 31 is a shunt static exciter (SSE), for example. The voltage regulator can sense the generator voltage, compare a rectified sample of that voltage with a reference voltage and supply the field current required to maintain a predetermined ratio between the generator voltage and the reference voltage. The circuitry can include a sensing circuit, an error detector, an error amplifier, a power controller and a stabilization network.

Voltage regulator 31 generally constitutes means responsive to the A.C. output voltage $V_{AB}$ for producing a variable regulating voltage $V_R$ having an average value which falls to a predetermined value (typically but not necessarily zero) upon an increase in the A.C. output voltage exceeding a preselected parameter.

The phrase "preselected parameter" refers to any quantity selected to specify a boundary for use in analyzing desirability of the behavior of the A.C. output voltage for purposes of voltage regulation. When an A.C. output voltage level exceeding the nominal voltage by a specified percentage is considered undesirable, the specified percentage or the corresponding voltage is a preselected parameter, for example. The preselected parameter can alternatively be a specified rate of change in the A.C. output voltage which when exceeded indicates that the generator voltage is abruptly changing and will become excessive in actual voltage unless corrective action is taken.

The variable regulating voltage is typically a series of pulses which are varied in width to adjust the average value of the regulating voltage. However, it is also contemplated that the pulses can be adjusted in height, or in both height and width to adjust the average value. In addition the variable regulating voltage can be a variable D.C. voltage without division thereof into pulses. The phrase "average value" of the variable regulating voltage for the present purposes is used to assist in discussing the behavior of voltage regulators of a variety of types which either produce pulsating or continuous regulating voltages. In mathematical terms "average value" is related to the integral of the variable regulating voltage from a general time T over a subsequent time interval t, where time interval t is the repetition period of the pulses when used, according to the equation $$V_{av} = \int_{T}^{T+t} V_R(T) dT / t \quad (5)$$

When a continuous regulating voltage is used, the time interval t in Equation (5) is regarded as being sufficiently short so that the "average value" reduces to the instantaneous value of the continuous (nonpulsating) regulating voltage at any given time T.

Figure 2C:
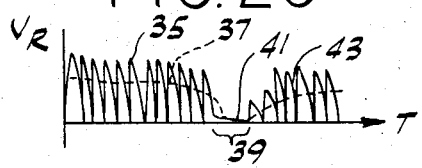
FIG. 2C is a voltage-versus-time graph of variable regulating voltage from a voltage regulator in the inventive control apparatus in the system of FIG. 1.

In FIG. 2C the regulating voltage VR of voltage regulator 31 is illustrated as a series of pulses 35 having steeply rising leading edges and somewhat more slowly falling trailing edges. The average value of of the series of pulses 35 is indicated by dashed line 37. When rise 19 of FIG. 2A occurs in the generator A.C. output voltage $V_{AB}$, voltage regulator 31 causes pulses 35 of FIG. 2C to cease during a time interval 39 lasting until A.C. output voltage returns to nominal. The average value of the series of pulses falls to a predetermined Yalue of zero as indicated by numeral 41 and subsequently rises above the predetermined value of zero as indicated by numeral 43.

Figure 2D:
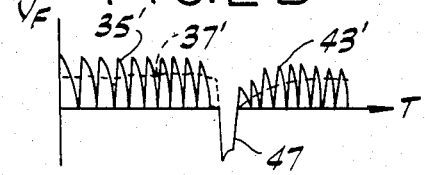
FIG. 2D is a voltage-versus-time graph of voltage across a field winding of the generator in the system of FIG. 1.

FIG. 2D shows the voltage $V_F$ produced by control apparatus 17 across the winding 15. Pulses 35' and their average value 37' are the same as pulses 35 and average value 37 of FIG. 2C until the rise 19 in voltage VAB of FIG. 2A. Then negative forcing control circuit 33 responds by electrically introducing resistance R into the circuit. Current $I_F$ flows through resistance R and through a freewheeling diode 45 protectively wired across output terminals F+ and F− of voltage regulator 31. The voltage drop across freewheeling diode 45 is essentially zero as indicated by numeral 41 of FIG. 2C, so the voltage drop $V_F$ across winding 15 must go negative (negative voltage portion 47 in FIG. 2D) to balance the voltage drop $RI_F$ generated in resistance R. Energy is consumed from winding 15 by resistance R as a result. When voltage $V_{AB}$ has been returned to nominal, control apparatus 17 resumes producing pulses 43' in FIG. 2D which corresponds to pulses 43 of FIG. 2C. At this time negative forcing control circuit 33 bypasses resistance R, electrically removing it from the circuit, and thereby coupling voltage regulator 31 to winding 15 with negligible loss of energy. It is to be understood, of course, that energy is still dissipated by the internal resistance $R_F$ of winding 15, but there is negligible loss of energy in resistance R or negative forcing control circuit 33 when current $I_F$ is bypassed around resistance R. As a result, energy savings are achieved, and undesired high temperatures which would be produced by resistance R if it consumed energy in the circuit at all times are avoided.

A backup battery 51 for startup purposes is connected across winding 15 by normally-open switch 53 and a blocking diode 55. The blocking diode 55 is connected so that current can flow to the field when switch 53 is closed during generator startup, but prevents regulating voltage $V_R$ from flowing back into the battery.

Figure 3:
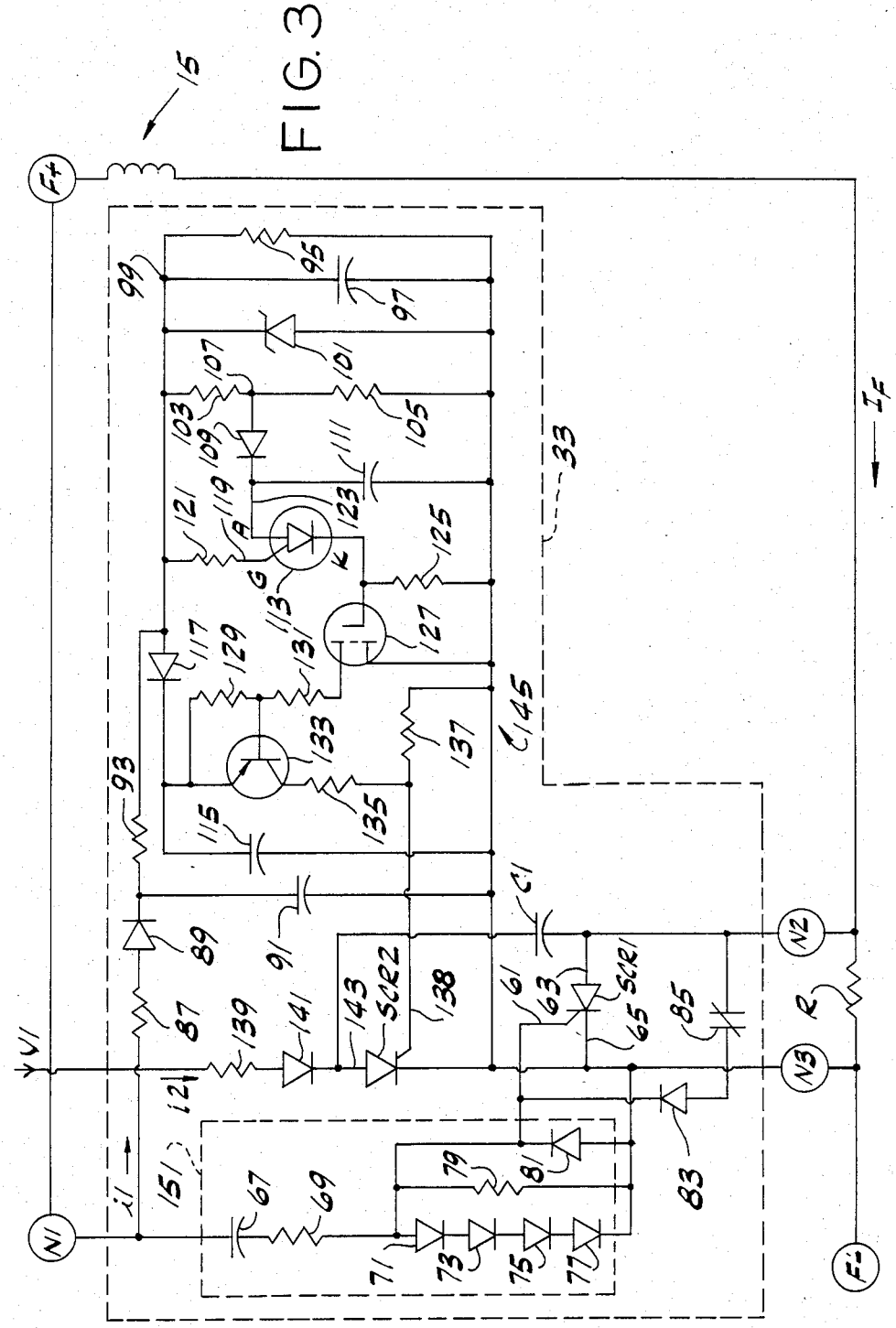
FIG. 3 is an electrical schematic diagram of a negative forcing control circuit according to the invention for use in the system of FIG. 1.

In FIG. 1 lines A, B, and C are connected to voltage sensing terminals conventionally designated E1, E2, and E3 on voltage regulator 31. Power for voltage regulator 31 is provided in a conventional manner from lines A, B, and C through a three phase transformer 32, to a set of terminals conventionally designated P1, P2, and P3. FIGS. 1 and 3 show winding 15 connected with resistance R between terminals F+ and F− of an SSE shunt static exciter used as voltage regulator 31 of FIG. 1. Negative forcing control circuit 33 is connected at a terminal N1 thereof to terminal F+ and connected across resistance R at terminals N2 and N3.

Until negative forcing is to be applied, current $I_F$ flows from the F+ terminal through the winding 15 to the anode of a silicon controlled rectifier SCR1 and thence to terminal F−. Silicon controlled rectifier SCR1 is a triggerable semiconductor switching device which turns on when a positive triggering voltage is applied to a gate terminal 61 and when there is voltage to bias its anode 63 positive with respect to its cathode 65. When the gate voltage is removed, the silicon controlled rectifier SCR1 continues to be in a conductive state so long as current $I_F$ flows through SCR1.

When the voltage regulator 31 of FIG. 1 applies pulses 35 of positive voltage across terminals F+ and F−, silicon controlled rectifier SCR1 is rendered conductive or turned on through capacitor 67, and resistor 69 connected to the gate 61 of SCR1. A series string of diodes 71, 73, 75, 77, and resistor 79 are connected across the gate 61 and cathode 65 of SCR1 and protect SCR1 from excess gate voltage. Diode 81 protects SCR1 from negative voltage if such is accidentally applied to terminal N1. Gate 61 is temporarily provided with positive voltage from anode 63 upon generator startup by means of a diode 83 and normally-closed contacts 85 of a startup relay K1 associated with voltage regulator 31 of FIG. 1. This provision assures that SCR1 is triggered on and resistance R is bypassed during initial generator startup conditions. When the generator is successfully started, the contacts 85 open and do not further affect the operation of SCR1. Contacts 85 and diode 83 thus constitute means for triggering the triggerable semiconductor means on when the generator A.C. output voltage is below a predetermined A.C. output voltage level.

Positive voltage at terminal F+ is provided to terminal N1 and causes a current i1 to flow through a resistor 87 and diode 89 into a network including a storage capacitor 91, and voltage divider resistors 93 and 95. A capacitor 97 at node 99 is charged to illustratively 20 volts whence the zener voltage of a zener diode 101 is reached. The 20 volts across capacitor 97 is applied to another set of voltage divider resistors 103 and 105. The voltage thereby supplied at node 107 is applied to a diode 109 and a capacitor 111 supplying the anode of a silicon controlled rectifier 113. An additional capacitor 115 is charged up to about 20 volts through a diode 117 from node 99.

A gate terminal 119 of SCR 113 is tied to the node 99 through a resistor 121 and SCR 113 is kept off as long as its anode 123 has a lower voltage than the gate terminal 119. This voltage relationship, however, is reversed when the variable regulating voltage across terminals F+, F− falls to zero when and if generator load rejection occurs. Diodes 89 and 117 become reversed biased, preventing capacitors 91 and 115 from discharging in unintended paths. Capacitors 91 and 97 do discharge through resistors 93, 95, 103, and 105, however, causing the voltage at the gate terminal 119 of SCR 113 to fall. The anode voltage of SCR 113 remains high since diode 109 becomes reverse biased as the voltage of node 107 falls, and the capacitor 111 remains charged. When the gate voltage of SCR 113 falls below its anode voltage, SCR 113 conducts. The capacitor 111 then discharges through SCR 113 through resistor 125 and turns on field effect transistor (FET) 127.

When FET 127 is turned on, current flows through resistors 129 and 131 and consequently through the base-emitter circuit of PNP transistor 133. Transistor 133 conducts, and the capacitor 115 discharges through resistors 135 and 137, applying a pulse of voltage at a gate 138 of a silicon controlled rectifier SCR2 to turn it on.

In FIG. 3 an A.C. supply voltage V1 is obtained from any suitable source such as an A.C. power takeoff terminal conventionally designated P1 on an SSE shunt static exciter. Supply voltage V1 causes a current i2 to flow through a resistor 139 and a diode 141 to charge a capacitor C1 to approximately 100 volts positive at anode 143 of SCR2 relative to the anode 63 of silicon controlled rectifier SCR1. The silicon controlled rectifier SCR2 constitutes means for switching the capacitor C1 when charged across the triggerable semiconductor switching means comprised by silicon controlled rectifier SCR1 in response to the variable regulating voltage across terminals F+, F− falling to zero, the charged capacitor C1 diverting the current of the winding 15 from the triggerable semiconductor switching means and turning it off.

Negative forcing control circuit 33 together with resistance R constitutes means responsive to the regulating voltage falling to the predetermined value for consuming energy from the winding and for coupling the regulating voltage means to the winding with negligible loss of energy when the average value of the regulating voltage is above the predetermined value. Negative forcing control circuit 33 constitutes switching means connected across the resistance and which when rendered conductive bypasses the resistance and couples the regulating voltage means to the winding with negligible loss of energy and means for rendering the switching means nonconductive in response to the fall in the average value of the variable regulating voltage to the predetermined value, thereby causing the resistance to consume energy from the winding. The switching means comprises triggerable semiconductor means (e.g. SCR1) which when triggered on conducts a current for the winding and remains on as long as the current for the winding flows in said triggerable semiconductor means. The means for rendering the switching means nonconductive comprises a capacitor (e.g. C1), means for charging the capacitor (e.g. resistor 139 and diode 141), and means for switching the charged capacitor across the triggerable semiconductor means in response to the fall in the average value of the variable regulating voltage to the predetermined value, to turn off the triggerable semiconductor means by diverting the current for the winding therefrom. The means for switching the charged capacitor across the triggerable semiconductor means includes second triggerable semiconductor means (e.g. SCR2) and means exemplified by circuit portion 145 for triggering the second triggerable semiconductor means. The triggering means includes second and third capacitors (e.g. capacitors 111 and 97 respectively) and means for charging the capacitors from the variable regulating voltage and for isolating the capacitors from the regulating voltage and from each other (e.g. components 87, 89, 91, 93, 95, 103, 105, and 109) when the fall in the average value of the variable regulating voltage to the predetermined value occurs, the second capacitor discharging more slowly than the third capacitor. The triggering means also includes means for producing a signal (e.g. circuit portion including SCR 113, FET 127 and transistor 133) for triggering the second triggerable semiconductor means when the voltage across the second capacitor (e.g. capacitor 111) exceeds the voltage across the third capacitor (e.g. capacitor 97) by at least a predetermined voltage.

Capacitor C1 is selected large enough in capacitance and charged to a sufficiently high voltage so that when it is switched across the anode and cathode of SCR1, the winding current $I_F$ is diverted temporarily into capacitor C1 and completely away from silicon controlled rectifier SCR1. Silicon controlled rectifier SCR1 is consequently rendered nonconductive; it is turned off. The capacitor C1 is very quickly charged in the opposite direction by the winding current $I_F$, which continues to flow even when the variable regulating voltage from terminal F+ to F− has dropped to zero. Resistance R consequently receives the current $I_F$ and rapidly consumes energy from the winding 15, accomplishing negative forcing.

Put another way, the current diverting action occurs as follows. While SCR1 is conducting, capacitor C1, connected between the anodes of SCR1 and SCR2, is charged up with the positive terminal connected to the anode of SCR2. When SCR2 is triggered, its anode-cathode impedance becomes very low, and its anode-cathode voltage drops to about one volt. When this happens, the anode voltage of SCR1 becomes reversed by the amount of voltage of capacitor C1. SCR1 is a typical SCR which ceases conduction with negative anode-cathode voltage. Field current $I_F$ cannot change abruptly, so momentarily it flows through capacitor C1 and SCR2 instead of SCR1 (thereby being diverted from SCR1), until capacitor C1 is fully charged in a polarity opposite to the polarity of its initial charge. Field current $I_F$ then flows through resistance R until SCR1 is again triggered on.

If it were not for resistance R, the winding current $I_F$ would decay relatively slowly as discussed hereinabove. On the other hand, if the resistance R were in series with the field winding at all times, unnecessary energy loss would continuously occur. Advantageously, the circuitry of the invention controls SCR1 as a normally-conductive current switching means connected with the winding, the resistance R, and the voltage regulator 31 so that when SCR1 is conductive, the voltage regulator 31 is directly coupled to the winding 15 and when SCR1 is nonconductive, the resistance R is exposed to the winding 15. In this way, the resistance R consumes energy only when negative forcing is needed and is effectively bypassed by SCR1 otherwise.

As the current $I_F$ decreases due to the negative forcing by resistance R and the winding inherent resistance $R_F$, the generator voltage $V_{AB}$ drops back to its nominal voltage. The voltage regulator 31 resumes supplying voltage (e.g. pulses 43 of FIG. 2C) across terminals F+ and F− to deliver energy to the winding 15. This voltage also triggers the gate of SCR1 through capacitor 67 and resistor 69, turning SCR1 back on so that current $I_F$ again flows through SCR1 instead of resistance R. As a whole circuitry 151 including capacitor 67, resistors 69 and 79 and diodes 71, 73, 75, 77, and 81 generally constitutes means for triggering on the triggerable semiconductor means (e.g. SCR1) when the variable regulating voltage rises from the predetermined value (e.g. zero).

Figure 4:
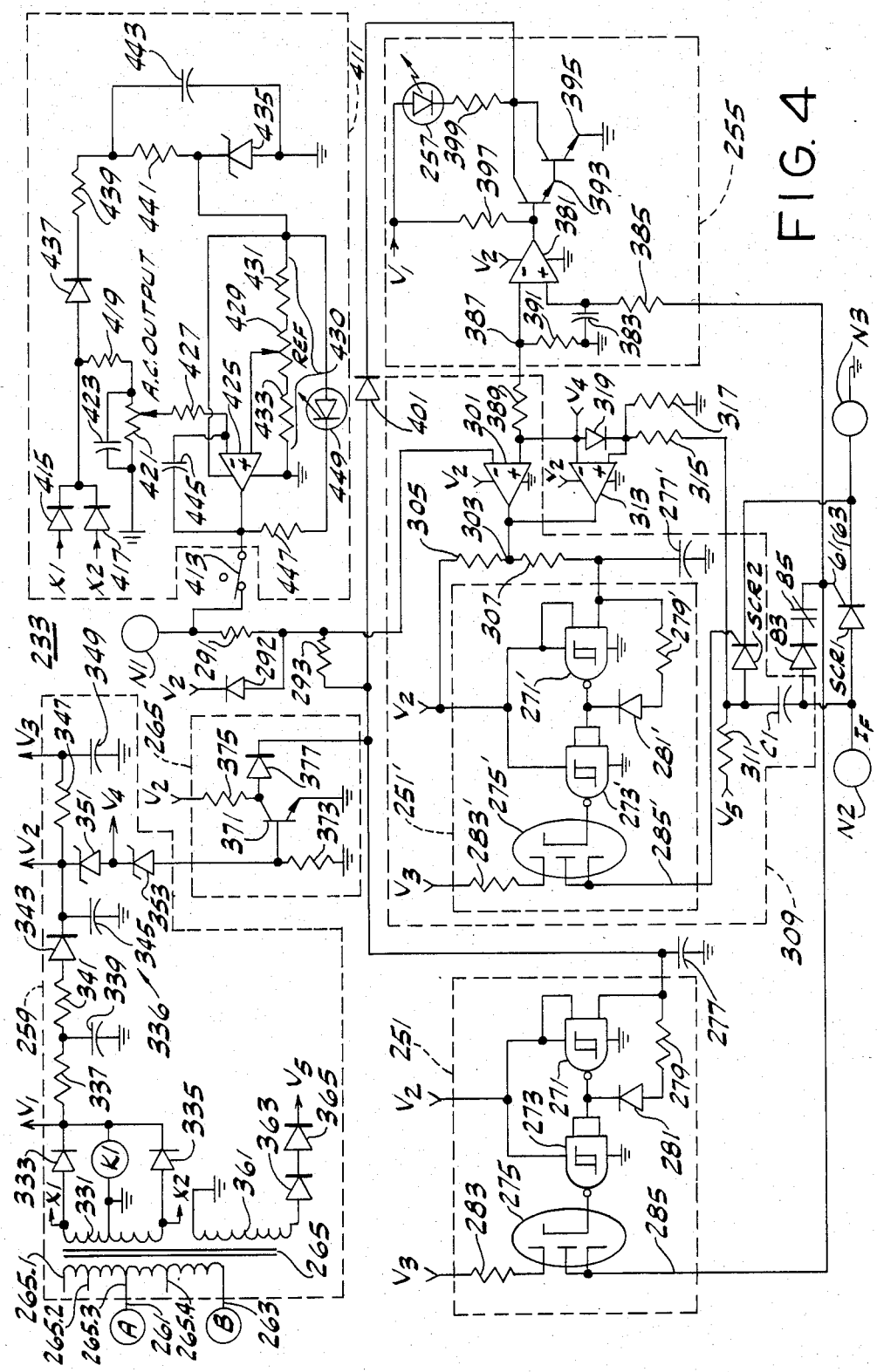
FIG. 4 is an electrical schematic diagram of an alternative negative forcing control circuit according to the invention for use in the system of FIG. 1.

FIG. 4 shows another preferred embodiment designated 233 of the negative forcing control circuit 33 of FIG. 1. Terminals N1, N2, and N3, silicon controlled rectifiers SCR1 and SCR2, capacitor C1, and diode 83 and K1 relay contacts 85 have identical functions to the correspondingly numbered elements in FIG. 3. A circuit 251 produces a pulse to trigger SCR1 on and render it conductive, and is analogous in function to circuit 151 of FIG. 3. A circuit 251' is constructed identically to circuit 251, but produces a pulse to trigger SCR2 on and thereby turn SCR1 off and render SCR1 nonconductive for negative forcing. A further circuit 255 drives a light emitting diode (LED) 257 for indicating whether SCR1 is on or off. When SCR1 is on, the LED 257 is on, and when negative forcing occurs, LED 257 is off. A power supply 259 is connected by leads 261 and 263 to lines A and B for obtaining A.C. output voltage $V_{AB}$ from generator 11 of FIG. 1. A circuit 265 senses whether the generator 11 has been started up sufficiently to cause power supply 259 to supply usable voltage and to cause circuit 251 to trigger SCR1 in a manner similar in function to the relay K1 contacts 85.

Negative forcing control circuit 233 is adapted for triggering SCR devices selected for SCR1 and SCR2 having relatively high current ratings by virtue of the construction of the identical triggering circuits 251 and 251'. Additionally circuit 233 is adapted for applications in a multitude of electrical power generating systems by virtue of power supply 259 which includes transformer 265 having several primary winding taps 265.1, 265.2, 265.3, 265.4, two of which are selected as shown for connection by leads 261 and 263.

Circuits 251 and 251' each function as pulse generators. Since their components are identical, the components in circuit 251' are numbered identically but primed corresponding to those in circuit 251. The internal detail for circuit 251 is described and that for circuit 251' is omitted for brevity. Circuit 251 has two NAND gates with hysteresis 271 and 273 wired as inverters driving a FET 275. An input High to gate 271 on capacitor 277 brings the output of gate 271 low until capacitor 277 is at least partly discharged through resistor 279 and diode 281. Gate 273 inverts the output low from gate 271, turning on FET 275 as long as the output of gate 271 is low, and FET 275 thereby delivers a triggering pulse of current from power supply 259 through resistor 283 on output line 285.

Terminal N1 of negative forcing control circuit 233 receives regulating voltage from terminal F+ of FIG. 1 when such regulating voltage is being produced or resumed. The regulating voltage charges capacitor 277 by means of resistor 291, clamp diode 292, and resistor 293, causing circuit 251 to trigger SCR1 on. A comparator 301 simultaneously produces an output low at node 303, keeping circuit 251' from triggering SCR2, because capacitor 277' is discharged.

On the other hand, when the average value of the regulating voltage at terminal N1 falls to a predetermined value such as zero upon load rejection, capacitor 277 is discharged and circuit 251 produces no pulses. Comparator 301 produces an output high at node 303, permitting capacitor 277' to charge from the power supply through resistors 305 and 307. Circuit 251' is activated and triggers SCR2, rendering SCR1 nonconductive and commencing negative forcing. As such, the portion of circuitry surrounded by dashed line 309 and including comparator 301, circuit 251', capacitor C1 and silicon controlled rectifier SCR2 constitutes means for rendering the switching means (E.G. SCR1) nonconductive when the variable regulating voltage falls to and remains at the predetermined value for a predetermined time interval, thereby causing the resistance R to consume energy from the winding. The predetermined time interval is set by the values of capacitor 277' and resistors 305 and 307.

Capacitor C1 is charged from power supply 259 through resistor 311. A comparator 313 senses the voltage on capacitor C1 through a voltage divider consisting of resistors 315 and 317. Unless capacitor C1 is charged, the output of comparator 313 to node 303 is held low, by action of a forward biased diode 319. When capacitor C1 is charged, however, it brings the noninverting input of comparator 313 high and lifts the disabling low from node 303. Comparators 301 and 313 are of a type, such as open-collector devices, that can have their outputs directly connected together and to node 303. Comparator 313 thus constitutes means for sensing whether the capacitor C1 is discharged and preventing operation of the means for switching (e.g. circuit 251' and SCR2) the capacitor across the triggerable semiconductor means (e.g. SCR1) while the capacitor is discharged.

The means for triggering SCR2 includes circuit 251' which constitutes means for supplying a pulse to trigger SCR2 upon an input voltage to the pulse supplying means exceeding a predetermined level. The triggering means also includes a second capacitor (e.g. capacitor 277'), and means for charging the second capacitor at a controlled rate (e.g. resistors 305 and 307), the voltage across the second capacitor constituting the input voltage, and means for discharging the second capacitor (e.g. comparator 301) before it charges to a voltage exceeding the predetermined level unless the variable regulating voltage falls to the predetermined value (e.g. zero). Comparator 313 constitutes means for sensing when the first-named capacitor (e.g. C1) is discharged and in that case discharging the second capacitor (e.g. 277') before it charges to a voltage exceeding the predetermined level regardless of the variable regulating voltage.

In power supply circuit 259 transformer 265 has AC voltage of a center-tapped secondary winding 331 converted to DC by diodes 333 and 335. This rectified DC is filtered by a network 336 including resistor 337, capacitor 339, resistor 341, diode 343, capacitor 345, resistor 347, and capacitor 349. The network 336 supplies voltages $V_1$, $V_2$, and $V_3$. Two zener diodes 351 and 353 hold $V_2$ at illustratively 10 volts, and provide a further voltage $V_4$ of 5 volts. A separate secondary winding 361 supplies an A.C. voltage which is half-wave rectified by seriesconnected diodes 363 and 365 to supply rectified voltage $V_5$ for charging C1 through resistor 311.

A startup relay K1 is supplied with voltage V1 when generator 11 of FIG. 1 is brought up to sufficient speed to energize it. Before relay K1 is energized, contacts 85 in FIG. 4 are closed and help trigger SCR1 in the startup process. Circuit 265 performs an additional startup measure. Zener diode 353 is connected to the base of a transistor 371 which is also resistively connected to ground by resistor 373. In the startup process, voltage $V_2$ rises from zero. Before it reaches the zener breakdown voltage, there is relatively little current flowing through the zener diodes 351 and 353, so transistor 371 is off. Voltage $V_2$ is coupled through resistor 375 and diode 377 to capacitor 277 and circuit 251 causing a trigger pulse for SCR1 to bypass the resistance R, since resistance R is not desired in the startup process. When voltage $V_2$ reaches the zener breakdown point, zener diodes 351 and 353 conduct a significant amount of current, turning on transistor 371 and causing diode 377 to stop triggering SCR1 by means of circuit 251. Circuit 265 thus constitutes means for triggering the triggerable semiconductor means on when the generator A.C. output voltage is below a predetermined A.C. output voltage level.

When SCR1 is rendered conductive and winding current $I_F$ is flowing through it, a potential of about 0.7 volts is developed between its gate 61 and cathode 63. A comparator 381 in circuit 255 senses this potential across a capacitor 383 through resistor 385 and compares it with a 0.5 volt reference voltage developed at node 387 of a ten-to-one voltage divider consisting of resistors 389 and 391 fed by the 5 volt $V_4$ voltage. When capacitor 383 is charged, the output of comparator 381 goes high; a Darlington pair of transistors 393 and 395 is caused to conduct by means of resistor 397. LED 257 emits light as voltage V1 impresses a current through it and resistor 399.

The collector of transistor 395 thus is low when SCR1 is rendered conductive and winding current $I_F$ is flowing. In a further advantageous feature, a diode 401 is connected from capacitor 277 on the input of circuit 251 to the collector of transistor 395. When transistor 395 collector is low, capacitor 277 is kept discharged by diode 401 preventing any more triggering pulses from being generated by circuit 251 when SCR1 is already rendered conductive. When the variable regulating voltage at terminal N1 commences or resumes, resistors 291 and 293 constitute means for charging the capacitor (e.g. 277) at a controlled rate, the voltage across the capacitor constituting an input voltage for circuit 251. Diode 401 constitutes means for discharging capacitor 277 before the capacitor charges to a voltage exceeding the predetermined level (e.g. for activating circuit 251) if the triggerable semiconductor means SCR1 is already on.

When terminal N1 of negative forcing control circuit 233 of FIG. 4 is connected to terminal F+ of the voltage regulator 31 of FIG. 1, comparator 301 indirectly senses when an increase in the A.C. output voltage exceeding a preselected parameter occurs and produces a signal at node 303. Circuit 251' constitutes means for rendering the switching means (e.g. SCR1) nonconductive in response to the signal thereby causing the resistance R to consume energy from the winding 15.

In FIG. 4, direct sensing of the A.C. output voltage is accomplished by a circuit 411 when terminal N1 is disconnected from terminal F+ of the voltage regulator 31 and switch 413 is closed as shown. Then circuit 411 together with comparator 301 constitute means directly responsive to the A.C. output voltage for sensing when the increase in the A.C. output voltage exceeds the preselected parameter then producing the signal at node 303. Similarly, circuit 411 together with circuit 251 constitute means directly responsive to the A.C. output voltage for rendering the switching means (e.g. SCR1) conductive when the A.C. output voltage falls below a preestablished level.

Circuit 411 has full wave rectifier diodes 415 and 417, the anodes of which are connected along leads X1 and X2 to winding 331 of transformer 265 to sense the A.C. output voltage of the generator 11. The rectified voltage so produced is impressed across a voltage divider consisting of a resistor 419 and a potentiometer 421. Some filtering of the voltage across the potentiometer 421 is accomplished by a capacitor 423. A comparator 425 receives a D.C. voltage from the wiper of potentiometer 421 proportional to the A.C. output voltage $V_{AB}$ at an inverting (−) input through a resistor 427. The comparator 425 also receives a reference voltage at its noninverting (+) input from the wiper of another potentiometer 429 in a network 430 also including series resistors 431 and 433. A constant voltage is impressed across the network 430 by a zener diode 435 fed from diodes 415 and 417 through a diode 437 connected in series with resistors 439 and 441. A filter capacitor 443 is connected from ground to both of the resistors 439 and 441. The voltage of the zener diode also serves as a constant voltage for powering the comparator 425.

The output of comparator 425 is fed to the rotor of switch 413, to a capacitor 445 connected between the comparator output and its inverting (−) terminal, and to a resistor 447 connected in series with a light emitting diode (LED) 449 to zener diode 435.

Although both potentiometers 421 and 429 are both adjustable for calibration purposes, only potentiometer 421 provides a voltage to comparator 425 varying with the A.C. output voltage of the generator 11 once the potentiometer 421 has been set. The voltage on the wiper of potentiometer 429 remains constant once potentiometer 429 has been set, because the voltage across zener diode 435 is constant. To calibrate the circuit 411, the generator voltage $V_{AB}$ is set to its nominal operating voltage. Switch 413 of FIG. 4 is moved from its on position (shown) to its off or "Calibrate" position. The wiper of the potentiometer 429 is initially moved to the lowest voltage position nearest resistor 433, and the wiper of the potentiometer 421 is moved to the lowest voltage position nearest ground. In these wiper positions, LED 449 does not glow because the output of comparator 425 is high.

Next, the wiper of potentiometer 421 is turned toward increasingly higher voltage positions in the direction of resistor 419 until LED 449 glows. This calibrates the threshold of circuit 411 to A.C. output voltage to 100% of nominal with potentiometer 429 at the low end of its travel. Resistors 419, 431 and 433 are selected in value so that the threshold of circuit 411 with potentiometer 429 at the high end of its travel is at some value such as 150% of nominal generator voltage. An indicator dial associated with potentiometer 429 is appropriately marked in values of voltage or percentage amounts above 100% nominal. Then the dial is set to the desired threshold. Calibration being completed, switch 413 is returned to its on position as shown in FIG. 4.

During operation when no negative forcing is required, the output of comparator 425 is high and comparator 301 has its output held low. Accordingly, circuit 251' does not trigger SCR2 and SCR1 bypasses resistance R. When there is a load rejection which causes the generator voltage to rise above the threshold selected by potentiometer 429, the output of comparator 425 goes low, causing the output of comparator 301 to go high. Capacitor 277' charges and circuit 251' triggers SCR2, which in turn switches capacitor C1 across SCR1 and renders SCR1 nonconductive. Resistance R of FIG. 1 is no longer bypassed and negative forcing occurs. When the generator voltage $V_{AB}$ drops below the threshold, comparator 425 again goes high. Since SCR1 is not conducting, diode 401 is not forward biased, and circuit 251 is activated by the high output of comparator 425. Circuit 251 supplies a pulse to the gate 61 of SCR1, rendering it conductive and negative forcing is terminated because resistance R is again bypassed.

It is contemplated that the invention will find wide application to generators with D.C. energization fed directly to the field or through slip rings to the field. When negative forcing according to the invention is to be applied to generators of the brushless type, the L/R time constant of the main alternator field should be compared with the time constant of the field of the rotary exciter. If the main field time constant is substantially greater than the time constant of the rotary exciter field, then doing negative forcing on the rotary exciter field alone may provide only a relatively modest improvement in system performance. To achieve more substantial improvements the inventive apparatus and methods are advantageously also applied to the main field of the alternator in a brushless generator by providing another resistor R and another negative forcing circuit 33 of FIG. 1 on the rotor itself. The regulating voltage $V_R$ utilized on the rotor-mounted circuit 33 is then the D.C. output from the rotary exciter itself, and the rotary exciter is a voltage regulator as seen by the main field.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For use in an electrical power generating system including a generator for supplying an A.C. output voltage to a load on a set of lines, means responsive to the A.C. output voltage for producing a regulating voltage, the generator having a winding the D.C. energization of which controls the A.C. output voltage, and an electrical resistance for connection between the winding and the voltage regulating means, apparatus for controlling the energization of the winding comprising:

switching means adapted to be connected across the resistance and which when rendered conductive bypasses the resistance to couple the regulating voltage from the volatage regulating means to the winding with negligible loss of energy;

means for producing a signal when an increase in the A.C. output voltage exceeding a preselected parameter occurs;

means for rendering the switching means nonconductive in response to the signal thereby causing the resistance to consume energy from the winding; and means directly responsive to the regulating voltage for rendering the switching means conductive when the regulating voltage rises above a predetermined value.

2. For use in an electrical power generating system including a generator for supplying an A.C. output voltage to a load on a set of lines, means responsive to the A.C. output voltage for producing a regulating voltage, the generator having a winding the D.C. energization of which controls the A.C. output voltage, and an electrical resistance for connection between the winding and the voltage regulating means, apparatus for controlling the energization of the winding comprising:

switching means adapted to be connected across the resistance and which when rendered conductive bypasses the resistance to couple the voltage regulating means to the winding with negligible loss of energy;

means for producing a signal when an increase in the A.C. output voltage exceeding a preselected parameter occurs;

means for rendering the switching means nonconductive in response to the signal thereby causing the resistance to consume energy from the winding; and means for rendering the switching means conductive when the A.C. output voltage falls below a preestablished level.

3. The apparatus as set forth in claim 2 wherein said signal producing means comprises means directly responsive to the A.C. output voltage for sensing when the increase in the A.C. output voltage exceeds the preselected parameter and then producing the signal.

4. The apparatus as set forth in claim 3 wherein said switching means comprises triggerable semiconductor means which when triggered on conducts a current for the winding and remains on as long as the current for the winding flows in said triggerable semiconductor means, and said means for rendering the switching means nonconductive comprises a capacitor, means for charging said capacitor, and means for switching said charged capacitor across said triggerable semiconductor means in response to the signal, to turn off said triggerable semiconductor means by diverting the current for the winding therefrom.

5. For use in an electrical power generating system including a generator for supplying an A.C. output voltage to a load on a set of lines, means responsive to the A.C. output voltage for producing a regulating voltage, the generator having a winding the D.C. energization of which controls the A.C. output voltage, and an electrical resistance for connection between the winding and the voltage regulating means, apparatus for controlling the energization of the winding comprising:

switching means adapted to be connected across the resistance and which when rendered conductive bypasses the resistance to couple the voltage regulating means to the winding with negligible loss of energy;

means for producing a signal when an increase in the A.C. output voltage exceeding a preselected parameter occurs, said signal producing means comprising means directly responsive to the regulating voltage for sensing when the regulating voltage falls to a predetermined value for a predetermining time interval and then producing the signal; and means for rendering the switching means nonconductive in response to the signal thereby causing the resistance to consume energy from the winding.

6. The apparatus as set forth in claim 5 wherein said switching means comprises triggerable semiconductor means which when triggered on conducts a current for the winding and remains on as long as the current for the winding flows in said triggerable semiconductor means, and said means for rendering the switching means nonconductive comprises a capacitor, means for charging said capacitor, and means for switching said charged capacitor across said triggerable semiconductor means in response to the signal, to turn off said triggerable semiconductor means by diverting the current for the winding therefrom.

7. For use in an electrical power generating system including a generator for supplying an A.C. output voltage to a load on a set of lines, the generator having a winding the D.C. energization of which controls the A.C. output voltage, apparatus for controlling the energization of the winding, comprising:

means responsive to the A.C. output voltage for producing a variable regulating voltage having an average value which falls to a predetermined value upon an increase in the A.C. output voltage exceeding a preselected parameter; and means responsive to the regulating voltage falling to the predetermined value for consuming energy from said winding and for coupling the voltage regulating means to the winding with negligible loss of energy when the average value of the regulating voltage is above the predetermined value.

8. The apparatus as set forth in claim 7 wherein the energy consuming and coupling means comprises:

an electrical resistance for connection between the winding and the voltage regulating means;

switching means connected across the resistance and which when rendered conductive bypasses the resistance and couples the voltage regulating means to the winding with negligible loss of energy; and means for rendering the switching means nonconductive when the variable regulating voltage falls to and remains at the predetermined value for a predetermined time interval, thereby causing the resistance to consume energy from the winding.

9. The apparatus as set forth in claim 7 wherein the energy consuming and coupling means comprises:

an electrical resistance for connection between the winding and the voltage regulating means;

switching means connected across the resistance and which when rendered conductive bypasses the resistance and couples the voltage regulating means to the winding with negligible loss of energy; and means for rendering the switching means nonconductive in response to the fall in the average value of the variable regulating voltage to the predetermined value, thereby causing the resistance to consume energy from the winding.

10. The apparatus as set forth in claim 9 wherein the energy consuming and coupling means further comprises means for rendering the switching means conductive when the variable regulating voltage rises above the predetermined value.

11. The apparatus as set forth in claim 9 wherein said switching means comprises triggerable semiconductor means which when triggered on conducts a current for the winding and remains on as long as the current for the winding flows in said triggerable semiconductor means, and said means for rendering the switching means nonconductive comprises a capacitor, means for charging said capacitor, and means for switching said charged capacitor across said triggerable semiconductor means in response to the fall in the average value of the variable regulating voltage to the predetermined value, to turn off said triggerable semiconductor means by diverting the current for the winding therefrom.

12. The apparatus as set forth in claim 11 further comprising means for triggering on said triggerable semiconductor means when the variable regulating voltage rises from zero.

13. The apparatus as set forth in claim 7 wherein the predetermined value is zero.

14. For use in an electrical power generating system including a generator for supplying an A.C. output voltage to a load on a set of lines and means responsive to the A.C. output voltage for producing a variable regulating voltage having an average value which falls to a predetermined value upon an increase in the A.C. output voltage exceeding a preselected parameter, the generator having a winding the D.C. energization of which controls the A.C. output voltage, apparatus for controlling the energization of the winding, comprising:

an electrical resistance for connection between the winding and the voltage regulating means;

switching means connected across the resistance and which when rendered conductive bypasses the resistance to couple the voltage regulating means to the winding with negligible loss of energy; and means for rendering the switching means nonconductive in response to the fall in the average value of the variable regulating voltage to the predetermined value to cause the resistance to consume energy from the winding.

15. The apparatus as set forth in claim 14 wherein said means for rendering the switching means non-conductive comprises means for generating a signal when the variable regulating voltage falls to and remains at the predetermined value for a predetermined time interval.

16. The apparatus as set forth in claim 15 wherein the predetermined value is zero.

17. The apparatus as set forth in claim 14 further comprising means for rendering the switching means conductive when the variable voltage rises above the predetermined value.

18. The apparatus as set forth in claim 14 wherein said switching means comprises triggerable semiconductor means which when triggered on conducts a current for the winding and remains on as long as the current for the winding flows in said triggerable semiconductor means, and said means for rendering the switching means nonconductive comprises a capacitor, means for charging said capacitor, and means for switching said charged capacitor across said triggerable semiconductor means in response to the fall in the average value of the variable regulating voltage to the predetermined value, to turn off said triggerable semiconductor means by diverting the current for the winding therefrom.

19. The apparatus as set forth in claim 18 wherein said means for switching said charged capacitor across said triggerable semiconductor means comprises second triggerable semiconductor means and means for triggering said second triggerable semiconductor means, said triggering means including second and third capacitors and means for charging the capacitors from the variable regulating voltage and for isolating the capacitors from the regulating voltage and from each other when the fall in the average value of the variable regulating voltage to the predetermined value occurs, said second capacitor discharging more slowly than the third capacitor; and means for producing a signal for triggering said second triggerable semiconductor means when the voltage across said second capacitor exceeds the voltage across said third capacitor by at least a predetermined voltage.

20. The apparatus as set forth in claim 18 further comprising means for sensing whether said capacitor is discharged and preventing operation of said means for switching said capacitor across said triggerable semiconductor means while the capacitor is discharged.

21. The apparatus as set forth in claim 18 wherein said means for switching said charged capacitor across said triggerable semiconductor means comprises second triggerable semiconductor means and means for triggering said second triggerable semiconductor means, said triggering means including:

means for supplying a pulse to trigger said second triggerable semiconductor means upon an input voltage to said pulse supplying means exceeding a predetermined level;

a second capacitor, and means for charging said second capacitor at a controlled rate, the voltage across the second capacitor constituting the input voltage, and means for discharging said second capacitor before it charges to a voltage exceeding the predetermined level unless the variable regulating voltage falls to the predetermined value.

22. The apparatus as set forth in claim 21 wherein said means for rendering the switching means non-conductive further comprises means for sensing when said first-named capacitor is discharged and in that case discharging the second capacitor before it charges to a voltage exceeding the predetermined level regardless of the variable regulating voltage.

23. The apparatus as set forth in claim 18 further comprising means for triggering said triggerable semiconductor means on when the variable regulating voltage rises from the predetermined value.

24. The apparatus as set forth in claim 18 further comprising means for capacitively coupling the variable regulating voltage to the triggerable semiconductor means.

25. The apparatus as set forth in claim, 18 further comprising · means for supplying a pulse to trigger said triggerable semiconductor means upon an input voltage to said pulse supplying means exceeding a predetermined level;

a second capacitor and means for charging the second capacitor at a controlled rate when the variable regulating voltage resumes, the voltage across the second capacitor constituting the input voltage; and means for discharging the second capacitor before the capacitor charges to a voltage exceeding the predetermined level if the triggerable semrconductor means is already on.

26. The apparatus as claimed in claim 18 further comprising means for displaying an indication that the triggerable semiconductor means is on.

27. The apparatus claimed in claim 18 further comprising means for triggering said triggerable semiconductor means on when the generator A.C. output voltage is below a predetermined A.C. output voltage level.

28. A method of controlling an electrical power generating system including a generator for supplying an A.C. output voltage to a load on a set of lines and means responsive to the A.C. output voltage for producing a variable regulating voltage which falls to a predetermined value upon an increase in the A.C. output voltage exceeding a preselected parameter, the generator having a winding the D.C. energization of which controls the A.C. output voltage, the method comprising the steps of initiating consumption of energy from the winding in response to the fall in the variable regulating voltage to the predetermined value and then, when the variable regulating voltage rises above the predetermined value, coupling the voltage regulating means to the winding with negligible loss of energy.

29. A method of controlling an electrical power generating system including a generator for supplying an A.C. output voltage to a load on a set of lines, means responsive to the A.C. output voltage for producing a variable regulating voltage which falls to a predetermined value upon an increase in the A.C. output voltage exceeding a preselected parameter, the generator having a winding the D.C. energization of which controls the A.C. output voltage, and an electrical resistance connected to the winding, the method comprising the steps of:

coupling the regulating voltage means to the winding with negligible loss of energy by rendering a switching means conductive across the electrical resistance and between the regulating voltage means and the winding; and rendering the switching means nonconductive in response to the fall in the variable regulating voltage to the predetermined value to cause the resistance to consume energy from the winding.

30. The method as set forth in claim 29 wherein the step of rendering the switching means nonconductive comprises generating a signal when the variable regulating voltage falls to and remains at the predetermined value for a predetermined time interval.

31. The method as set forth in claim 30 wherein the predetermined value is zero.

32. The method as set forth in claim 29 further comprising the step of again rendering the switching means conductive when the variable regulating voltage, having fallen, rises above the predetermined value.

33. The method as set forth in claim 29 wherein the switching means includes triggerable semiconductor means which when triggered on conducts a current for the winding and remains on as long as the current for the winding flows in the triggerable semiconductor means, and the step of rendering the switching means nonconductive comprises diverting the current from the triggerable semiconductor means in response to the fall in the variable regulating voltage to the predetermined value.

34. The method as set forth in claim 33 wherein the step of rendering the switching means nonconductive comprises charging a capacitor and switching the charged capacitor across the triggerable semiconductor means in response to the fall in the variable regulating voltage to the predetermined value, to divert the current.

35. The method as set forth in claim 34 further comprising the step of determining that the capacitor is charged prior to switching the capacitor across the triggerable semiconductor means.

36. The method as set forth in claim 33 further comprising the step of triggering on said triggerable semiconductor means when the variable regulating voltage rises from zero.

37. For use in an electrical power generating system including a generator for supplying an A.C. output voltage to a load on a set of lines, means responsive to the A.C. output voltage for producing a regulating voltage, the generator having a winding the D.C. energization of which controls the A.C. output voltage, and an electrical resistance for connection between the winding and the voltage regulating means, apparatus for controlling the energization of the winding comprising:

switching means adapted to be connected across the resistance and which when rendered conductive bypasses the resistance to couple the voltage regulating means to the winding with negligible loss of energy;

means for producing a signal when an increase in the A.C. output voltage exceeding a preselected parameter occurs; and means for rendering the switching means nonconductive in response to the signal thereby causing the resistance to consume energy from the winding, said signal producing means including means for supplying an electrical quantity representing the magnitude of the A.C. output voltage, means for adjusting the electrical quantity for calibration purposes, means for supplying an adjustable electrical reference, means for supplying the signal when the adjusted electrical quantity exceeds the adjustable electrical reference, means for displaying the presence of the signal, and switch means for temporarily disconnecting said signal supplying means from said means for rendering the switching means nonconductive to prevent a response thereof during calibration.

38. The apparatus as set forth in claim 5 further comprising means directly responsive to the regulating voltage for rendering the switching means conductive when the regulating voltage rises above the predetermined value.

39. The apparatus as set forth in claim 26 wherein said triggerable semiconductor means includes a silicon controlled rectifier (SCR) which develops a positive gate-to-cathode voltage when the SCR is conducting the current for the winding, and said displaying means includes indicating means, means for supplying a positive reference voltage which is less than the positive gate-to-cathode voltage when the latter occurs, and means for actuating said indicating means when the gate-to-cathode voltage in the SCR exceeds the reference voltage, to display the indication that the triggerable semiconductor means is on.

* * * * *